United States Patent
Kalt et al.

[11] Patent Number: 5,988,437
[45] Date of Patent: Nov. 23, 1999

[54] DEVICE FOR DRAINING OR STORING VISCOUS MATERIALS

[75] Inventors: Wolfram Kalt, Furstenfeld; Friedrich Ecker, Timelkam; Wilhelm Feilmair, Seewalchen; Franz Schwenninger, Konigsdorf; Michael Longin, Lenzing, all of Austria

[73] Assignee: Lenzing Aktiengesellschaft, Lenzig, Austria

[21] Appl. No.: 09/260,590

[22] Filed: Mar. 1, 1999

Related U.S. Application Data

[63] Continuation of application No. PCT/AT98/00157, Jun. 23, 1998.

[30] Foreign Application Priority Data

Jun. 27, 1997 [AT] Austria .................................... 1110/97

[51] Int. Cl.⁶ ...................................................... B08B 9/06
[52] U.S. Cl. ................................................. 222/1; 222/64
[58] Field of Search .................................. 222/1, 64, 14, 222/21; 141/106, 198, 69, 70; 264/37.1, 37.18, 37.2

[56] References Cited

U.S. PATENT DOCUMENTS

| | | | |
|---|---|---|---|
| 3,924,780 | 12/1975 | Elsworth | 222/64 |
| 4,102,968 | 7/1978 | Caswell | 264/117 |
| 5,540,264 | 7/1996 | Harp | 141/106 |
| 5,771,917 | 6/1998 | Carney et al. | 222/64 |

FOREIGN PATENT DOCUMENTS

| | | |
|---|---|---|
| 0626198 | 5/1994 | European Pat. Off. . |
| 0781598 | 5/1994 | European Pat. Off. . |
| 1800061 | 4/1970 | Germany . |
| 1443453 | 6/1993 | United Kingdom . |
| 9408162 | 4/1994 | WIPO . |
| 9621678 | 7/1996 | WIPO . |
| 9708482 | 3/1997 | WIPO . |

Primary Examiner—Steven O. Douglas
Attorney, Agent, or Firm—Baker & Botts LLP

[57] ABSTRACT

A device is disclosed to draw off or store viscous mass which is discharged from a process for example as a result of exothermal events. The device contains at least one unit which has one inlet for the viscous mass and one outlet and is at least partly filled with a non combustible liquid inert to the viscous mass. The unit can be in the form of a pipe or a receptacle. Preferably several units in the form of a pipe can be connected one with the other respectively with a unit in the form of a receptacle. The solution discharged can then be transported via the pipes to the receptacle.

37 Claims, 2 Drawing Sheets

DEVICE FOR DRAINING OR STORING VISCOUS MATERIALS

This application is a continuation of PCT/AT98/00157 filed Jun. 23, 1998 which is incorporated by reference herein.

BACKGROUND OF THE INVENTION

This invention relates to a facility to draw off or store viscous mass which is discharged from a process for example as a result of exothermal events.

The invention has further reference to the use of the device in accordance with the invention to draw off or store solutions of cellulose in an aqueous amine oxide discharged from a process to produce cellulosic moulded bodies for example as a result of exothermal events and a process to draw off and store solutions of this kind.

It is known that when transporting viscous mass in chemical or physical processes safety precautions are taken whereby in the event of operational malfunctions the masses are in part discharged from the means of transport.

This covers in particular processes for the production of cellulosic moulded bodies from solutions of cellulose in an aqueous tertiary amine oxide particularly N-methyl-morpholine-N-oxide (NMMO). These processes are known as the "Lyocell process" or the "amine oxide process".

One problem when producing cellulosic moulded bodies by dissolving the cellulose in a mixture of NMMO and water consists in the stabilisation of mouldable solutions obtained in this way. It appeared that when dissolving the cellulose in NMMO the cellulose begins to decompose which leads to an undesirable reduction in the degree of polymerisation of the cellulose and the formation of low molecular decomposition products when the solution is subjected to a thermal load for longer periods of time at temperatures above 100° C.

Moreover, amine oxides, and NMMO in particular, have a limited thermo-resistance which varies depending on the structure. The monohydrate of NMMO melts at temperatures of approximately 72° C., the anhydrous compound melts at 171° C. If the monohydrate is heated strong discolouring occurs at temperatures as of 120/130° C. Temperatures of this kind are quite common with processes to manufacture cellulosic moulded bodies. As of 175° C. strong exothermal reactions occur which can lead to an explosive procedure. In the course of these reactions NMMO is thermally decomposed mainly to N-methyl-morpholine, morpholine, formaldehyde and $CO_2$.

Since the compounds which form at the prevailing temperatures tend in general to be gaseous high pressures arise with the exothermal decomposition of NMMO which can lead to damage to apparatus parts.

To be able to draw viscous mass off from the process in the event of operational malfunctions, safety apparatuses are know from the state of the art, as are for example described in DE 18 00 061, PCT-WO 94/08162 or PCT-WO 97/08482.

The expert is now faced with the task how this discharged viscous mass can be further drawn off or stored. This is particularly true of mass which congeals when it cools down and which can, therefore, no longer be pumped or only be pumped with difficulty, such as for example solutions of cellulose in tertiary aqueous amine oxides.

EP-A 0 626 198 suggests a cylindrical shaped receptacle which has an entry opening for a congealing material drawn off from the process and at least two entrance openings. By opening the two entrance openings the material can be pushed from one of the two entrance openings to the other and removed from the receptacle in this way.

This apparatus has the disadvantage that the drawing off of a congealed viscous mass from a receptacle like this in the way described is very complicated since the mass settles down on the receptacle wall when congealing and has, therefore, to be scratched off. Moreover, the known apparatus has the disadvantage that the mass drawn off from this process has to be transported across long distances through pipes to the receptacle. The mass can thereby already congeal in the pipes thus leading to blockages.

SUMMARY OF THE INVENTION

It is the object of the invention to provide a device which avoids the disadvantages described of state of the art thereby allowing the drawing off or storage of the viscous mass emerging from the process in a simple and effective manner.

The object of the invention is solved by an apparatus which contains a unit which has an inlet for the viscous mass and an outlet and which is filled at least in part with a non combustible liquid inert to the viscous mass.

Since the unit of the device in accordance with the invention is at least partly filled with the liquid inert to the viscous mass it appears that the viscous mass cannot settle down on the wall of the unit when being inserted into the unit as a result of being moistened by the liquid.

The liquid can moreover serve to cool down the viscous mass.

The device according to the invention is sufficiently filled when there is always sufficient liquid in the device to sufficiently moisten the overall mass emerging.

The necessity for two entrance openings, as described in the state of the art, is avoided by the device in accordance with the invention. Only one outlet is required with the device in accordance with the invention by means of which the viscous mass can be drawn off from the unit with the inert liquid if necessary.

BRIEF DESCRIPTION OF THE DRAWINGS

Further objects and advantages of the invention will be more fully appreciated from a reading of the detailed description when considered with the accompanying drawings wherein.

DETAILED DESCRIPTION OF THE PREFERRED EMBODIMENTS

Figure 1:
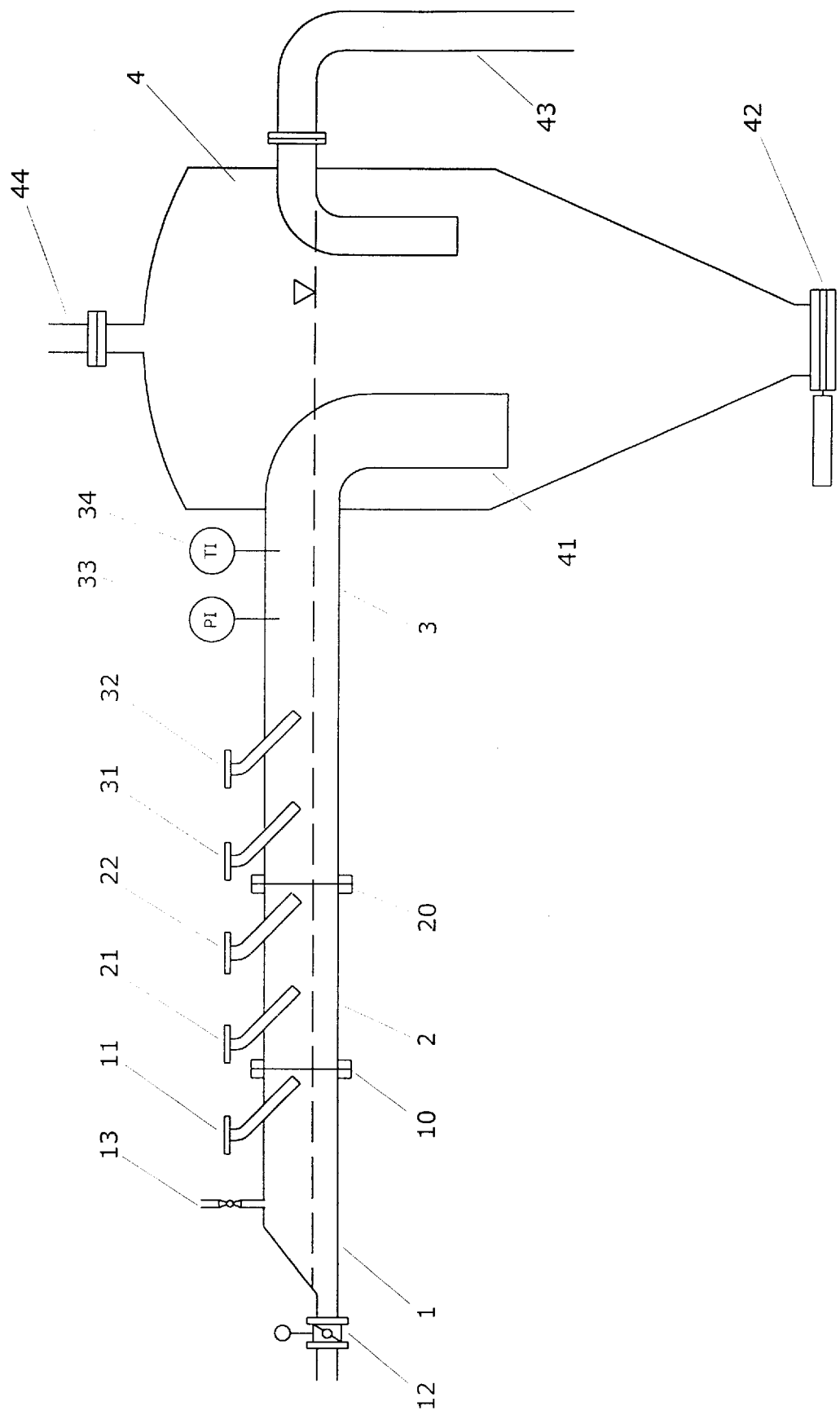
FIG. 1 is an illustration of an apparatus in including pipes connected in series in accordance with the invention.

All liquids are suitable as the inert liquid which exert no accelerating influence on the reactions taking place, as the case may be, in the viscous mass or which have a moistening and/or cooling effect which suffices so that the viscous mass cannot settle or can only settle down to a slight extent on the walls of the unit.

In the case of solutions of cellulose in aqueous tertiary amine oxides the inert liquid is preferably water. In this case coagulation of the cellulose takes place on the surface due to the water. The cellulose solution which coagulates on the surface in this way has less of a tendency to settle down on the wall of the unit and can thereby be easily further transported or drawn off.

The unit is preferably in the form of a pipe which is partly filled with the inert liquid and into which the viscous mass is inserted.

In an advantageous manner this pipe has means to transport the liquid or the viscous mass. To this end a device is particularly suited in which liquid under pressure is fed into the pipe via a shut-off device to be opened in the event of a malfunction. As a result of the pressure of the liquid fed to the pipe the liquid located in the pipe is further transported with the viscous mass. A pump can for example also be used as the means to transport the liquid or the viscous mass.

The pipe can, however, also be arranged at an angle whereby the liquid contained and viscous mass are further transported without any external exertion of force.

One advantageous embodiment of a unit shaped as a pipe with means of transport is characterised in that the inlet for the viscous mass is at least partly arranged in the transport direction. Thus the viscous mass is already partly moving in the transport direction when being inserted in the pipe and can therefore be more easily carried along by the fluid liquid.

It is particularly advantageous if the pipe is arranged directly near the point at which the viscous mass is drawn off from the process. In this way the partial congealing of the viscous mass during transportation to the device for drawing off or storage via longer pipes can be avoided. On the contrary, in this embodiment of the invention the device is directly arranged at the drawing off point of the viscous mass so that the viscous mass practically immediately enters into contact with the inert liquid and can be further transported quite easily for this reason.

Therefor in the event that several safety devices are provided in the plant through which the viscous mass can be drawn off in the event of a malfunction, several pipes, filled with inert liquid, can be provided directly next to these safety devices.

In the device in accordance with the invention preferably several units are provided in the form of pipes and connected in series. Shorter pipe parts can be provided which are connected to each other in a detachable fashion. This has the advantage compared to a device which has only one or only a few relatively long units in the form of a pipe, that in the event of the contamination of a short unit this can be dismantled and easily cleaned or can be replaced by a new unit. The device according to the invention, like a modular system, is very flexible and easy to plan, handle and modify.

In this embodiment of the invention the transition from one pipe to the neighbouring pipe forms the outlet of the pipe provided in accordance with the invention.

One other preferred embodiment of the device in accordance with the invention is characterised in that the unit is in the form of a receptacle. For the purpose of the present invention, compared to the units in the form of pipes, as a receptacle is meant a unit with a greater absorption capacity for viscous mass and liquid, e.g. a tank.

The viscous mass is inserted in a tank like this whereby the moistening of the mass by the liquid takes place as described above thus the mass does not settle down on the tank wall. In this case to empty the receptacle an outlet located on the lower end of the receptacle need only to be opened whereby the mass and the inert liquid can flow out freely.

The receptacle can for example be of cylindrical shape. Preferably the receptacle is designed so that it tapers towards the bottom in the shape of a funnel which makes the free outward flow, as described above, even easier.

A preferred embodiment of the device according to the invention contains on the one hand one or several units in the form of pipes and in addition a unit shaped as a receptacle, whereby the unit in the form of a pipe or as the case may be at least one of the units in the form of a pipe opens into the unit shaped as a receptacle.

With this embodiment the viscous mass can be transported with the inert liquid from the individual safety devices of the plant through the pipes partly filled with inert liquid which are preferably arranged directly next to the safety devices, to the receptacle where it can be stored and finally drawn off easily.

In connection with the preferred system of several pipes connected in series this embodiment can be easily adapted to any changes in the piping system of the plant at any time.

In an advantageous way means are provided in the device in accordance with the invention to keep the level of liquid in the unit constant. In the case of a unit in the form of a pipe this can be performed by a shut-off device by means of which the liquid under pressure when opening is fed into the pipe. Pumps which also serve to transport the liquid are suitable for this purpose. In the case of a receptacle an overflow can for example be arranged. The receptacle can thereby either be filled separately with the liquid or else the liquid needed to fill the tank stems from the pipes which open into the receptacle in the preferred embodiment of the device.

One other preferred embodiment of the device in accordance with the invention is characterised in that it has means to draw off the gases which occur during the exothermal event.

All kinds of venting devices are suitable for this. In EP-A 0 626 198 the device described is in the form of a pressure vessel in which a bursting disk breaks in the event of a malfunction as a result of the gas which has formed whereby the gas can emerge from the device.

In contrast to this, the device in accordance with the invention can basically be of open design since the liquid present in the units acts at least partly as a pressure-compensating sealing medium. Moreover large quantities of the incorporated gases can already condense or be absorbed in the liquid.

Thus for example in the event of using the device in accordance with the invention in the amine oxide process the amines which normally occur with exothermal events are absorbed in the water with which the device is filled. Thus the amount of gases to be removed is also reduced.

It is advantageous to feed the device with inert gas before or during an operational malfunction, e.g. nitrogen.

The units of the device in accordance with the invention can also for example be heated by a jacket which further reduces the danger of the viscous mass settling down on the walls of the units.

The device in accordance with the invention is exceptionally well suited to the drawing off or storage of solutions of cellulose in an aqueous tertiary amine oxide discharged from a process to produce cellulosic moulded bodies for example as a result of exothermal events.

One other object of the invention is therefore also a process to draw off or store a solution of cellulose in an aqueous tertiary amine oxide discharged from a process to produce cellulosic moulded bodies for example as a result of exothermal reactions whereby The solution is conveyed into a pipe which is at least partly filled with a non combustible liquid inert to the solution and thereby moistened by the liquid, the moistened solution in the pipe is transported with the liquid to a receptacle likewise filled at least partly with a non combustible liquid inert to the solution and the solution distributed in the liquid, which may be already congealed, is removed from the receptacle via an outlet The solution, directly next to the point at which the solution is removed from the process, is preferably transferred to the pipe filled in part with inert liquid.

In the following preferred embodiments of the device in accordance with the invention are described in greater detail using the drawings.

Figure 2:
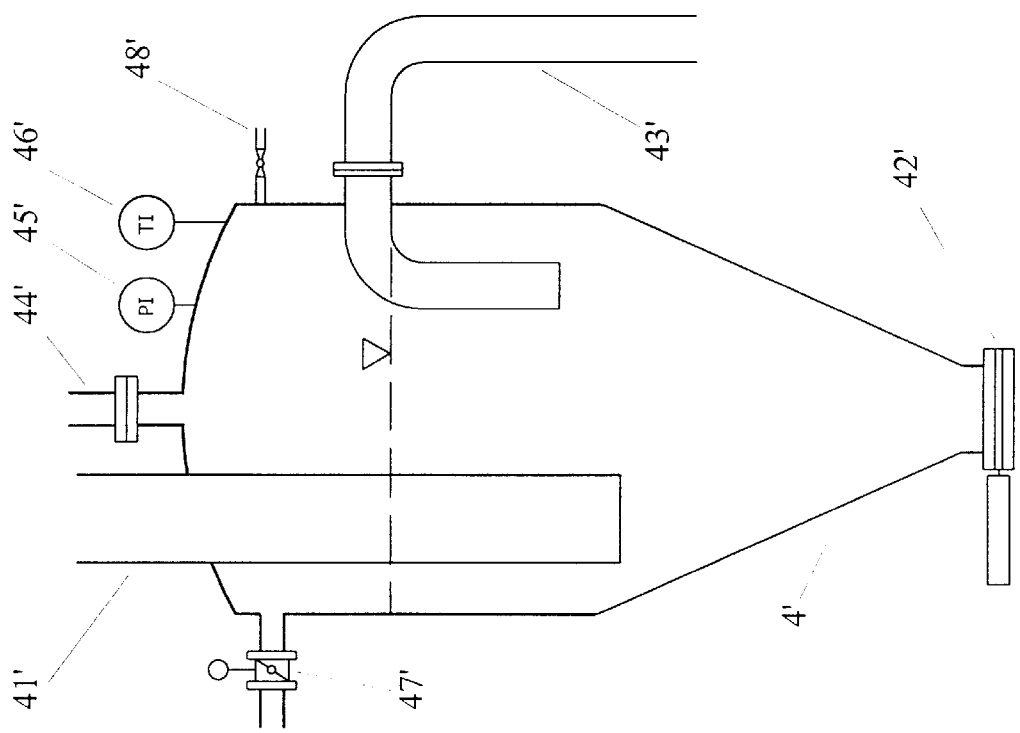
FIG. 2 is an illustration of an apparatus according to the invention which includes only one unit in the form of a receptacle.

FIG. 1 thereby represents a preferred embodiment of the device in accordance with the invention with units in the form of pipes and receptacles. FIG. 2 shows a device in accordance with the invention which contains only one unit in the form of a receptacle.

In FIG. 1 the reference FIGS. 1, 2 and 3 stand for three units in the form of a pipe connected in series. The units are, suggested by the broken line, partly filled with an inert liquid, for example with water in the case of the amine oxide process. The level equals approx. 30–40% of the height of the pipes 1, 2 and 3. Pipes 1, 2 and 3 are connected to each other in a detachable fashion by connecting elements (suggested by 10 and 20). In this embodiment the respective end of pipes 1 and 2 in the connecting elements forms on the one hand the outlet provided in accordance with the invention of the respective unit and on the other hand the transition to neighbouring pipes 2 respectively 3.

Pipe 1 has an inlet 11 for the viscous mass which basically points in the transport direction of the pipe. Inlet 11 is preferably arranged directly next to a safety device of the plant and connected to this. In pipe 1 moreover a shut-off device 12 is arranged which in the event of a malfunction is opened to insert more liquid and which thus serves to transport the liquid and the viscous mass through pipe 1, as well as further on through pipe 2 and pipe 3. To this end a liquid reservoir (not shown) is arranged in front of the closing and locking device with liquid under pressure. Moreover, an inlet 13 is arranged on pipe 1 for inert cleansing gas, e.g. nitrogen.

Pipe 2 shows two inlets 21 and 22 for the viscous mass which likewise are preferably arranged directly near a safety device on the plant and connected to this.

Like pipe 2 pipe 3 has two inlets 31 and 32 for the viscous mass. Moreover, pipe 3 has a pressure gauge 33 and a temperature gauge 34. If a disturbance is notified due to the efflux of viscous mass through a safety device of the plant, then one can check using this measuring equipment whether this is an exothermal event. This can be deduced from an increase in temperature and pressure.

Pipe 3 opens into a unit 4 in the form of a receptacle tank. Receptacle 4 is of cylindrical shape and tapers towards the bottom in the shape of a funnel. The end and thus the outlet of pipe 3 serves as inlet 41 for receptacle 4. Moreover, the receptacle has an outlet 42 which is closed by a bolt. An overflow pipe 43 ensures that the water level remains constant in the tank. An opening 44 is provided at the upper end of tank 4 by means of which any gases which have developed or gaseous overpressure can be removed.

For the expert it is clear that pipes 1,2 and 3 do not have to be straight pipes but rather can be laid or connected to each other in a way adapted to the location of the safety devices in the plant so that the pipes can be laid as closely as possible to the safety devices in the plant.

Moreover, several systems of pipes, similar to pipes 1,2, and 3, can open into receptacle/ tank 4 which transport viscous mass from other parts of the plant to the receptacle.

The mode of operation of the device in accordance with the invention according to FIG. 1 is described in the following:

In the event of a malfunction, for example an exothermal event, viscous mass emerges from one or several of the safety devices on the plant. This mass enters into one of the pipes 1, 2, 3, which are directly adjacent to the relevant safety device and connected thereto, via one of the inlets 11, 21, 22, 31 or 31 and is moistened by the liquid in the relevant pipe and thereby cooled down.

The gases which occur during the exothermal event provoke an increase in pressure which is measured by pressure gauge 33. Preferably the shut-off device 12 is only opened when this increase in pressure is measured whereby liquid under pressure is inserted into the pipes and the liquid located in the pipes is transported in the direction of receptacle 4. In this way the viscous mass, already present in the pipes on the one hand, the subsequently flowing viscous mass and which enters into the relevant pipe via the relevant inlet in the transport direction, is carried along.

The discharged viscous mass collects at the lower end of receptacle 4 partly filled with liquid without however settling down on the tank wall. The gases which have occurred flow upwards through opening 44.

To empty the receptacle the bolt at outlet 42 is merely opened and the liquid runs off together with the, as the case may be, already congealed mass.

To occasionally clean or exchange the units in pipe form 1, 2 and 3 these can be simply dismantled and re-installed or if necessary replaced by a new unit.

In FIG. 2, as in FIG. 1, unit 4' is shown basically in cylindrical form as a receptacle which tapers towards the bottom in the shape of a funnel. One or several pipes 41' open into receptacle 4'. Only one pipe 41' is depicted in FIG. 2. The end of pipe 41' serves simultaneously as an inlet for the receptacle. Pipe 41' is not filled with inert liquid in this embodiment. In addition to the same component parts 42', 43' and 44' as in FIG. 1, receptacle 4' has a pressure gauge 45' and a temperature gauge 46' which serve the same purpose as described in FIG. 1.

Moreover in receptacle 4' an inlet is arranged for inert liquid with a locking and closing device 47' which together with overflow 43' makes sure that the level of the inert liquid (suggested by a broken line) remains constant in the receptacle. Moreover a feeding pipe 48' is provided for cleansing gas, e.g. nitrogen.

The mode of operation of receptacle 4' is basically the same as described in FIG. 1 with the exception that no pipes partly filled with liquid open into receptacle 4'. The tank should preferably constantly be filled with liquid. The shut-off device 47' is only opened in the event of an exothermal incident to insert additional liquid.

This embodiment of the device in accordance with the invention is particularly conceivable where the discharged viscous mass does not have to be transported across long distances to receptacle 4'. Naturally several receptacles 4' can also be arranged near the safety devices of the plant depending upon the size of the plant.

We claim:

1. Apparatus to draw off and store viscous mass which is discharged from a process as a result of exothermic events comprising at least one unit which has an inlet for receiving the viscous mass and an outlet wherein said apparatus is at least partly filled with a noncombustible liquid inert to the viscous mass.

2. Apparatus according to claim 1 wherein at least one unit is in the form of a pipe.

3. Apparatus according to claim 2 further comprising means to transport the liquid or the viscous mass in the pipe.

4. Apparatus according to claim 3 wherein the inlet for the viscous mass is arranged such that the viscous mass flows into the apparatus substantially in the transport direction.

5. Apparatus according to claim 1 wherein at least one unit is in the form of a receptacle.

6. Apparatus according to claim 5 wherein the receptacle comprises a tank having a tapered bottom.

7. Apparatus according to claim 6 wherein the tank is in the shape of a funnel.

8. Apparatus according to any one of claims 2, 3 or 4 wherein at least one pipe is positioned adjacent a location at which the viscous mass is discharged from the process.

9. Apparatus according to claim 8 further comprising means for drawing off gases which occur during an exothermic event.

10. Apparatus according to claim 8 comprising a plurality of units in the form of pipes wherein the units are connected in series.

11. Apparatus according to claim 8 further comprising a unit in the form of a receptacle whereby at least one unit shaped as a pipe has an end which is received in the unit in the form of a receptacle.

12. Apparatus according to claim 8 further comprising means for maintaining a constant liquid level.

13. Apparatus according to any one of claims 2, 3 or 4 comprising a plurality of units in the form of pipes wherein the units are connected in series.

14. Apparatus according to claim 13 further comprising a unit in the form of a receptacle whereby at least one unit shaped as a pipe has an end which is received in the unit in the form of a receptacle.

15. Apparatus according to claim 13 further comprising means for maintaining a constant liquid level.

16. Apparatus according to claim 13 further comprising means for drawing off gases which occur during an exothermic event.

17. Apparatus according to any one of claims 2, 3, 4 further comprising a unit in the form of a receptacle whereby at least one unit shaped as a pipe has an end which is received in the unit in the form of a receptacle.

18. Apparatus according to claim 17 further comprising means for maintaining a constant liquid level.

19. Apparatus according to claim 17 further comprising means for drawing off gases which occur during an exothermic event.

20. Apparatus according to any one of claims 1, 2, 3, 4, 5 or 6 further comprising means for maintaining a constant liquid level.

21. Apparatus according to claim 20 further comprising means for drawing off gases which occur during an exothermic event.

22. Apparatus according to any one of 1, 2, 3, 4, 5, or 6 further comprising means for drawing off gases which occur during an exothermic event.

23. Process to draw off and store a solution of cellulose in an aqueous tertiary amine oxide discharged from a process to manufacture cellulosic moulded bodies as a result of exothermic events comprising the steps of:

conveying the solution into at least one pipe at least partly filled with a noncombustible liquid inert to the solution thereby moistening the solution with the liquid;

transporting the moistened solution and liquid in the at least one pipe to a receptacle wherein the receptacle is at least partly filled with a noncombustible liquid inert to the solution thereby distributing the solution in the noncombustible inert liquid in the receptacle; and removing the solution distributed in the liquid from the receptacle.

24. Method for drawing off and storing a solution of cellulose in an aqueous tertiary amine oxide discharged from a process for the production of cellulosic bodies as a result of exothermic events comprising the steps of:

providing an apparatus including at least one unit which has an inlet for receiving the solution and an outlet wherein the apparatus is at least partially filled with noncombustible inert liquid; and conveying the solution to the inlet.

25. Method according to claim 24 wherein at least one unit is in the form of a pipe.

26. Method according to claim 25 wherein the apparatus includes means for transporting the liquid or solution and comprising transporting the liquid or solution through the pipe.

27. Method according to claim 26 comprising locating the inlet so as to cause the solution to flow into the pipe in substantially the direction of transport.

28. Method according to claim 24 wherein the unit is in the form of a receptacle.

29. Method according to claim 28 wherein the receptacle includes a tank having a tapered bottom.

30. Method according to claim 29 wherein the tank is in the shape of a funnel.

31. Method according to any one of claims 25, 26 or 27 comprising locating the pipe adjacent a location at which the solution is discharged.

32. Method according to claim 31 comprising providing a plurality of units connected in series.

33. Method according to claim 32 wherein the apparatus further comprises a unit in the form of a receptacle and further comprising the step of providing an opening in the receptacle for receiving at least one pipe.

34. Method according to claim 31 wherein the apparatus filter comprises a unit in the form of a receptacle and further comprising the step of providing an opening in the receptacle for receiving at least one pipe.

35. Method according to any one of claims 25, 26 or 27 comprising providing a plurality of units connected in series.

36. Method according to claim 35 wherein the apparatus further comprises a unit in the form of a receptacle and further comprising the step of providing an opening in the receptacle for receiving at least one pipe.

37. Method according to any one of claim 25, 26 or 27 wherein the apparatus further comprises a unit in the form of a receptacle and further comprising the step of providing an opening in the receptacle for receiving at least one pipe.

* * * * *

UNITED STATES PATENT AND TRADEMARK OFFICE
CERTIFICATE OF CORRECTION

PATENT NO. : 5,988,437
DATED : November 23, 1999
INVENTOR(S) : Kalt et al.

It is certified that error appears in the above-identified patent and that said Letters Patent is hereby corrected as shown below:

Column 3, line 31: "Therefor" should read --Therefore--;

Column 4, line 65: "The" should read -- the --;

Column 5, line 3: "solution and" should read -- solution, and --;

Column 5, line 6: "outlet" should read -- outlet. --;

Column 5, line 9: "following preferred" should read -- following, preferred --;

Column 5, line 17: "reference FIGS." should read -- reference numerals --;

Column 5, line 28: "pipes 2 respectively 3." should read -- pipes 2 and 3, respectively. --;

Column 6, line 9: "31 or 31" should read -- 31 or 32 --;

Column 7, line 39: "2, 3, 4" should read --2, 3 or 4--

Column 7, line 54: "any one of 1, 2, 3, 4, 5, or 6" should read --any one of claims 1, 2, 3, 4, 5, or 6--.

Signed and Sealed this

Tenth Day of April, 2001

NICHOLAS P. GODICI

Attest:

Attesting Officer

Acting Director of the United States Patent and Trademark Office